United States Patent
Ann et al.

(10) Patent No.: US 8,407,079 B2
(45) Date of Patent: Mar. 26, 2013

(54) METHOD AND SYSTEM USING AN ENTERPRISE FRAMEWORK

(75) Inventors: Carol Ann, Huntly (GB); Clive Ernest Harris, Hook (GB); Ross William Leighton, Baulkham Hills (AU); Ernest James Wilkins, Stockbridge (GB)

(73) Assignee: International Business Machines Corporation, Armonk, NY (US)

( * ) Notice: Subject to any disclaimer, the term of this patent is extended or adjusted under 35 U.S.C. 154(b) by 2848 days.

(21) Appl. No.: 09/887,781

(22) Filed: Jun. 22, 2001

(65) Prior Publication Data

US 2002/0198727 A1    Dec. 26, 2002

(51) Int. Cl.
*G06Q 10/00* (2012.01)

(52) U.S. Cl. ............. 705/7.37; 705/7.36; 705/7.29; 705/1.1

(58) Field of Classification Search .............. 705/1.1, 705/7.29, 7.36, 7.37
See application file for complete search history.

(56) References Cited

U.S. PATENT DOCUMENTS

| | | | |
|---|---|---|---|
| 6,085,220 A * | 7/2000 | Courts et al. ............. 709/201 |
| 6,151,582 A * | 11/2000 | Huang et al. ............... 705/8 |
| 6,223,180 B1 * | 4/2001 | Moore et al. ................ 707/100 |
| 6,249,769 B1 * | 6/2001 | Ruffin et al. ................. 705/7 |
| 6,256,773 B1 * | 7/2001 | Bowman-Amuah .......... 717/121 |
| 6,424,979 B1 * | 7/2002 | Livingston et al. .......... 715/511 |
| 6,574,635 B2 * | 6/2003 | Stauber et al. ............ 707/103 R |
| 6,697,824 B1 * | 2/2004 | Bowman-Amuah .......... 709/229 |
| 6,789,252 B1 * | 9/2004 | Burke et al. ................. 717/100 |
| 7,069,234 B1 * | 6/2006 | Cornelius et al. ............ 705/26 |
| 7,162,427 B1 * | 1/2007 | Myrick et al. ................. 705/1 |
| 2001/0032092 A1 * | 10/2001 | Calver ......................... 705/1 |
| 2002/0049603 A1 * | 4/2002 | Mehra et al. ................ 705/1 |
| 2002/0049749 A1 * | 4/2002 | Helgeson et al. ............ 707/3 |
| 2002/0069102 A1 * | 6/2002 | Vellante et al. .............. 705/10 |
| 2002/0133368 A1 * | 9/2002 | Strutt et al. ................. 705/1 |
| 2002/0169658 A1 * | 11/2002 | Adler ........................ 705/10 |
| 2004/0059611 A1 * | 3/2004 | Kananghinis et al. ........ 705/7 |

\* cited by examiner

*Primary Examiner* — Dean T Nguyen
(74) *Attorney, Agent, or Firm* — Karuna Ojanen; John Pivnichny; Ojanen Law Offices

(57) ABSTRACT

A system and method of modeling an enterprise and its objectives and its information technology system into a single enterprise framework so that the effect of changes in one can be seen as impacting the other. In its preferred embodiment, a generic framework is customized to reflect changes for the industry and the enterprise and its objectives and uses a LOTUS NOTES database with a front-end navigator to make modifications. The enterprise framework includes a section on governance which provides an architectural framework and a management process for the enterprise framework.

8 Claims, 3 Drawing Sheets

METHOD AND SYSTEM USING AN ENTERPRISE FRAMEWORK

CROSS REFERENCE TO RELATED PATENTS

The present invention is related to the following documents, all of which are assigned to the assignee of the present invention and which are specifically incorporated herein by reference:
  Patent application Ser. No. 09/625,108 filed Jul. 25, 2000, now U.S. Pat. No. 6,950,802, by Steven D. Barnes et al. and entitled "Method and System for System Integration", a document which is sometimes referred to in this document as the SI Patent.
  Patent application Ser. No. 09/506,260 filed Feb. 17, 2000, now abandoned, by Brenda Barth-Harvey et al. and entitled "Automated Management Process for Enterprise Resource Planning System Implementation", a document which is sometimes referred to in this document as the Management Process Patent.
  Ser. No. 09/660,852, filed Sep. 13, 2000, now U.S. Pat. No. 7,788,118, by G. Vahee et al. and entitled "Project Management Method and System", a patent which is sometimes referred to in this document as the Worldwide Project Management Patent (or WWPMM) Patent.

BACKGROUND OF THE INVENTION

1. Field of the Invention

The present invention relates to techniques for using an enterprise-wide framework for managing the effects of changes in the business model and/or information technology environment on the operation of an enterprise. More particularly, the present invention includes an improved method and system for managing an enterprise and its information technology, to facilitate the analysis of changes on the enterprise and its information technology environment. The present invention includes an enterprise architecture with business and information technology components and defined linkages between them, which allow for the impact of changes in one component to drive the other component.

2. Background Art

The following description of the present invention is based on a presupposition that the reader has a basic knowledge of information technology (sometimes referred to as data processing) environments and the processes of designing, developing, assessing and modifying solutions within an information technology ("IT") function. Some of these processes are described in the SI Patent and the WWPMM Patent and the Management Process Patent referenced above. These patents provide a framework for making recommendations to a business, with regard to the information technology systems required to operate the business, and the management of changes in the business, to accommodate changes in strategy and objectives and, for designing an IT solution for the business.

Such an IT solution design process inherently involves consideration of the business requirements and objectives—that is, where the business is going and what is required of it. The purpose of any IT solution is to facilitate the underlying business objectives, objectives which may be subject to change over time. The impact of a change in a business objective may require a change in the IT systems and any change in an IT system may effect the business objectives.

Many prior art system for modeling a business and its data processing involve two separate and unconnected systems. That is, there is a business system model or architecture and an information technology model or architecture and different organizations are responsible for each and each are independent of the other.

Thus, the prior art provides systems for proposing change in information technology solutions and changes in business operations which may have undesirable disadvantages and limitations that impact the effectiveness of the assessments and limit the scope and effectiveness of recommendations for improvements. Often, these changes are defined in isolation, or with focus on a single system only, which limits the understanding of the total impact of the business decisions which have been taken.

SUMMARY OF THE INVENTION

The present invention overcomes the disadvantages and limitations of the prior art systems by providing a simple, yet effective, way of coordinating an organization's business objectives with its overall information technology (IT) environment.

The present invention has the advantage that it uses a single enterprise-wide framework which includes and links components from business strategic objectives, desired capabilities, principles business processes, information, IT capabilities with the plans to deliver and implement these capabilities. In the preferred embodiment of the present invention, this enterprise-wide framework is prepared and delivered in the form of a database using a tool such as LOTUS NOTES and includes a simple navigator which allows for the easy use and modification of any of the components of the framework to reflect changes to the business, its capabilities and offerings.

The present invention also has the advantage that the business strategic objectives, capabilities, principles, business processes, information and the IT capabilities are linked so that the true impact of a change in one component, can be readily understood and managed. As the business changes its strategy, the effect on its IT environment and operations can be seen and assessed. Likewise, a change in the IT capabilities and systems will have an effect on the business and its operation. These changes, when seen in the context of an enterprise-wide framework, allow the impact of proposed changes to be assessed prior to implementation.

A further advantage of the present system is that the use of a generic enterprise architecture allows relatively quick and easy customization for a particular organization and its business processes and business operations. That is, a generic enterprise architecture is the beginning point for changes to reflect the differences in the organization, its objectives and its operations.

The present invention has applicability to various forms of business operations and has been particularly relevant for (but not limited to) businesses who are choosing to embrace the use of electronic commerce as part of their strategic objectives. Use of a single enterprise-wide framework also allows for the integration of outputs from multiple engagements or activities. That is, it allows for the incorporation of outputs from previous and follow-on activities to be easily added, providing an ever-widening picture of the total business and IT environments that can be more effectively managed. The present invention includes an enterprise architecture that uses a common technology model, with business and application models which vary from industry to industry. This allows for generic/common processes, application function, data and infrastructure to be identified and shared, as well as incorporating and building on industry specific components and models.

Other objects and advantages of the present invention will become apparent to those skilled in the relevant art, as they view the following description of the preferred embodiment, together with the accompanying drawings and the appended claims.

BRIEF DESCRIPTION OF THE DRAWINGS

Having thus set forth some of the limitations and disadvantages of the prior art and some objects and advantages of the present invention, other objects and advantages will be apparent to those skilled in the relevant art, as they view the following drawings and their descriptive material and consider the accompanying claims. These drawings illustrate the present invention of an enterprise-wide framework and method in which:

DETAILED DESCRIPTION OF THE PREFERRED EMBODIMENT

In the following description of the preferred embodiment, the best implementations of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
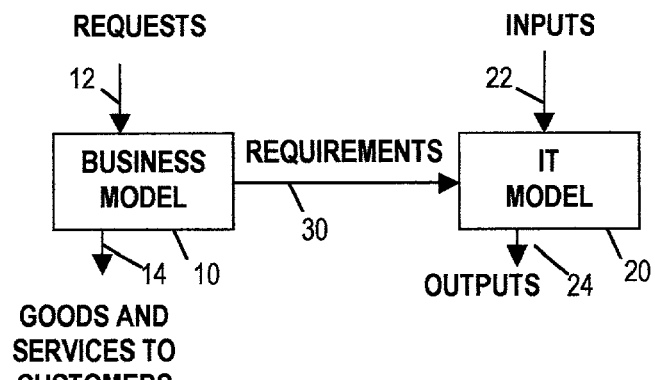
FIG. 1 is a diagram illustrating functionally, a prior art approach which looks at the enterprise's business models and environment, separate from its information technology systems and environment.

FIG. 1 shows one approach in the prior art to modeling the business, where a first business model 10 deals with the strategy and functions of the business, including the requests 12 it receives for offerings and the goods and services 14 it delivers to customer. The business model 10 generates requirements 30 for its data processing or information technology, which requests are transmitted to the IT function of the organization to handle. The IT function has an IT model 20 which includes various elements of hardware and software to perform the functions set forth in the requirements 30 provided by the business and the business model 10. The IT model 20 includes inputs 22 and outputs 24. This approach is rather simple and does not reflect that the IT operations are interdependent on the business model, with changes in the IT model 20 having the capability to influence changes in the business model 10.

Figure 2:
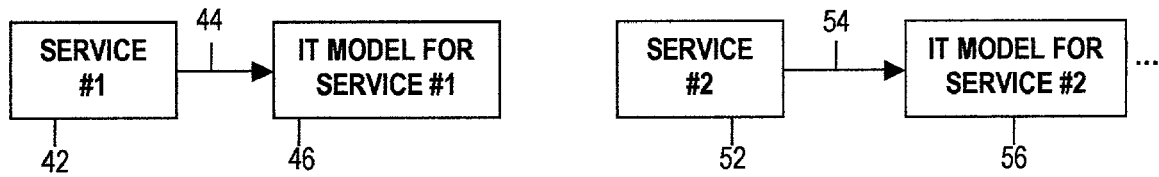
FIG. 2 is an alternative diagram of the prior art, illustrating a different approach which considers each business and information technology environment/system as a discrete operation.

FIG. 2 illustrated another system for managing the information technology of a business in which the business is a plurality of offerings, represented in this illustration by two of the offerings, service #1 represented by block 42 and service #2 represented by block 52. Each of the offerings independently generates its own set of requirements which are passed to an IT model for that offering, so a first IT model 46 serves service #1 and its requirements as illustrated by the arrow 44 and IT model 56 serves service #2 and its requirements 54. Adding a new service means adding a model of the new service and adding an IT model for the requirements of new service. When a service is provided, it may or may not be related to existing services.

Figure 3:
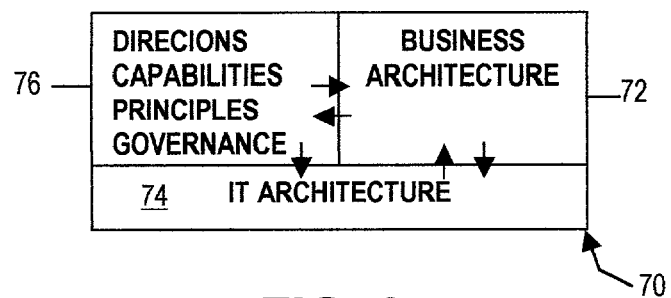
FIG. 3 is a high-level diagram illustrating the integration of the business components with the information technology components, used to create an enterprise architecture of the present invention.

FIG. 3 illustrates the present invention which is an enterprise architecture 70 which includes and combines a business architecture 72 with an IT architecture 74 into a single and integrated architecture. Also shown are various external items 76 such as strategic directions, capabilities, principles and governance which impact the business architecture 72, the IT architecture 74 or both.

In its preferred embodiment of the present invention, this enterprise architecture 70, with the business architecture 72 and the IT architecture 74, begins as a generic model which is not specific to any industry, set of offerings or customer and is modified to reflect the differences in the industry and the uniqueness of the customer and its environment and requirements.

The enterprise architecture 70 may be stored in any convenient tool or repository. While in some cases the architecture may exist solely in a printed form, the printed form is difficult to modify. Consequently, the enterprise architecture of the present invention is often stored in a data processing system in the form of a LOTUS NOTES™ database which can be easily accessed and modified. Each section described below may be implemented as a database, such as a relational or hierarchical database, or as a knowledge-based system, or the like. For purposes of the specification and claims, a database is intended to encompass persistent storage of data in the appropriate computer language and operating system. An optional front-end navigator may be provided which allows for selected sections of the database to be accessed and manipulated by way of a browser or some other user terminal application via the Internet, intranet or some other network. Access to various sections, including databases, records, pages, documents, fields, and so forth and parts thereof may be controlled by way of access control lists (ACLs), such as is implemented in LOTUS NOTES™ and DOMINO™, or the like. Also, these database components may be distributed as database instances among several sites in support of distributed development and market engagement teams, and synchronized using, for example, NOTES™ replication techniques to maintain consistency among the various instances. The elements may also be managed using a collaboration space, such as the LOTUS QUICKPLACE™.

This modification of the generic enterprise model allows for industry practices and customer uniquenesses to be reflected in an enterprise model which is customized to the particular customer, yet based on a common set of technologies.

Figure 4:
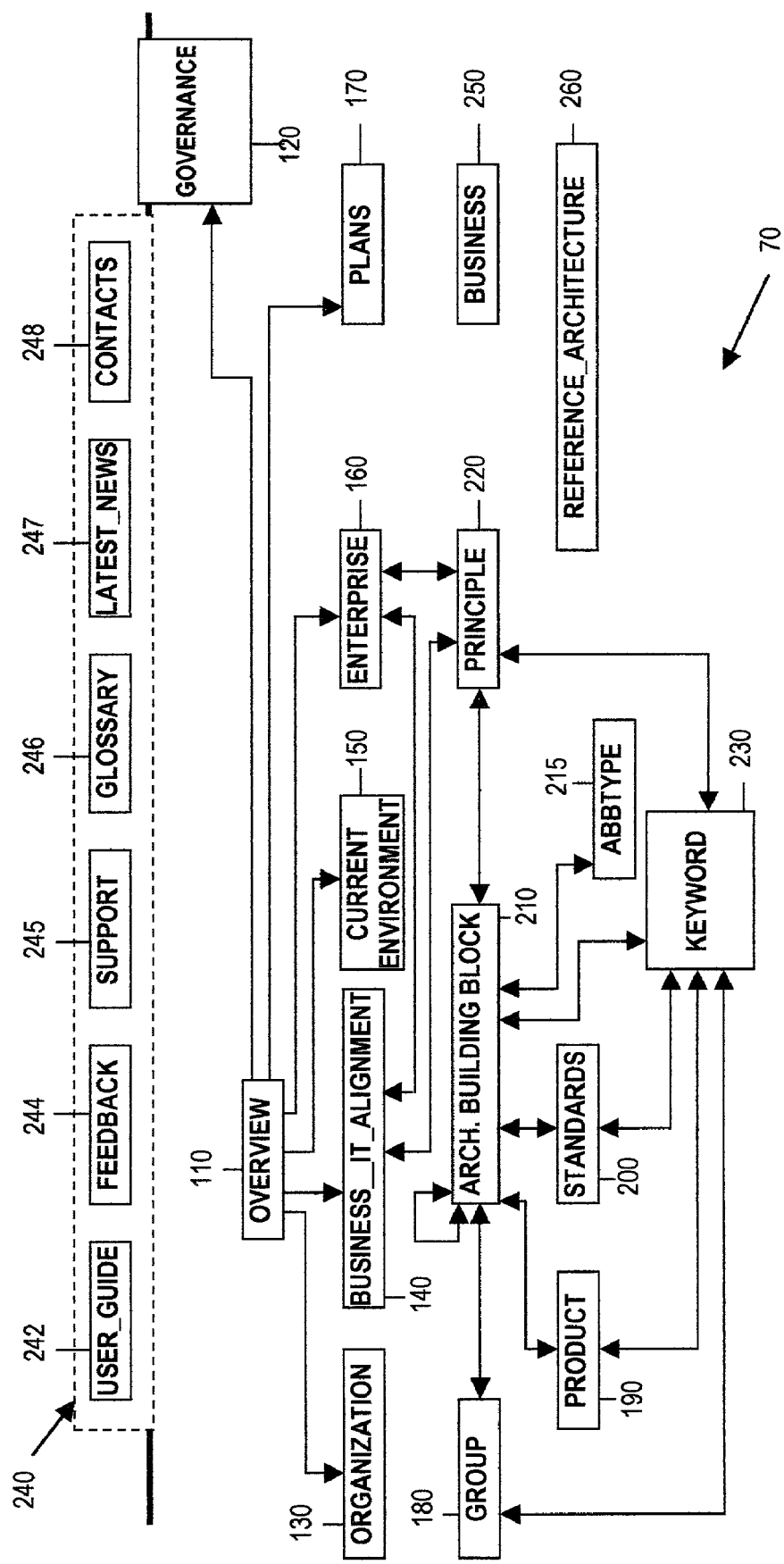
FIG. 4 is a more detailed diagram illustrating the underlying structure of the database and linkages which are involved in the present invention.

FIG. 4 illustrates a form of the generic enterprise architecture 70 of the present invention in which an overview block 110 introduces other sections and provides a way to navigate through the model and find a desired portion. These other sections include a governance section 120, an organization section 130, a business IT alignment section 140, a current environment section 150, an enterprise section 160 and a plans section 170.

The governance section 120 provides architecture management framework, architecture management processes and conformance and evaluation criteria and tools. That is, it includes rules and processes which govern the rest of the operations.

The organization section 130 includes a structure of the business organization, the IT organization, the roles and responsibilities of members of the organization, either specifically or generally (by department or function, for example). It also includes details on the education and training for the organization as well as an inventory of skills and sets for the policies and practices of the organization. In many organizations, the structure is shown not only for the present but also for the future, including reorganizations which have not yet been implemented.

The business IT alignment section 140 provides a statement of the business strategy and objectives as well as the IT strategy and vision. It also includes the business model and process.

The current environment section 150 provides a statement of the business, application environment, data environment, IT environment and management of the organization as it presently exists.

The enterprise section 160 provides a statement of the capabilities of the organization in terms of its business, IT and business requirements.

The plans section 170 provides various type of plans for the organization: business, IT, project, transition, and organization and change plans.

In addition, the enterprise architecture reflects that groups such as user groups impact the organization and its IT model with the group section 180 and the architecture building blocks 210.

The enterprise architecture also includes a products section 190, a standards section 200, and a principles section 220. The principles section 220 is coupled to the enterprise section 160, the architectural building blocks 210 and the business IT alignment section 140 and indicates where each principle applies and how it is used. The products section 190 is coupled to the architectural building block section 210, as is the standards section 200, and both indicate which applies to and where each is used.

Guiding information is provided by block 240 to assist the user in navigating through the enterprise architecture. It includes a user guide 242 on how to use the architecture, a feedback system 244 to provide responses, a support section 245 providing a pointer to where to obtain assistance in using the architecture along with a contact list 248, a glossary 246 which includes definitions of terms used in the architecture so that all terms will be consistently used and a news section 247 which includes information detailing recent changes to the system.

The present system also include a business section 250 (which includes details on the business areas and units, unit plans, business locations, processes and activities and needs) and a reference architecture section 260 which includes a description of reference architectures and models.

Figure 5:
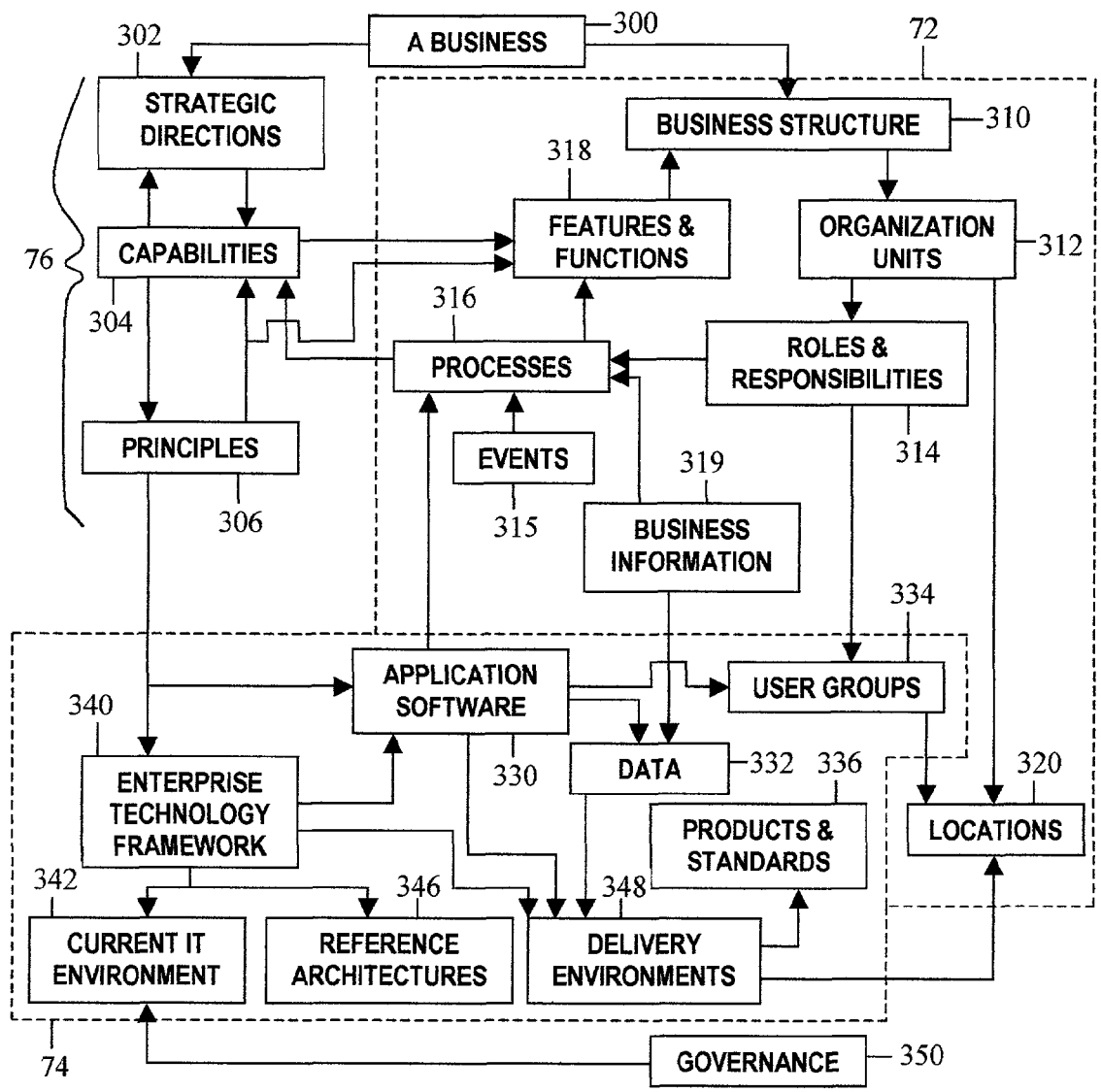
FIG. 5 provides a detailed view of the component parts of the enterprise-wide framework of FIG. 3, showing the relationship between the various drivers of a business, providing an improved perspective of the present invention.

FIG. 5 illustrates an elaboration on FIG. 3 to illustrate the relationship of entities and their relationship to illustrate drivers of the business. As shown in this figure, a business 300 defines strategic directions 302 which are delivered by capabilities 304 which are drivers for principles 306 and all of this forms a part of the environment 76 of the business. The environment 76 of the business interacts with the business architecture 72 and the IT architecture 74 as will be described. The capabilities 304 underpin the strategic direction 302 of the organization and are controlled by the principles 306.

The business architecture 72 indicates that the business has a business structure 310 which is reflected in organization units 312 (sometimes referred to as operating units).

The organization units 312 have roles and responsibilities 314 which relate to processes 316. The processes 316 are enablers for capabilities 304 of the organization and are implemented in features and functions 318 which deliver the capabilities of the organization. Business information 319 supports processes 316. Events 315 trigger or initiate the processes 316 and may be internal events (such as the time to prepare statements or to post interest) or external events (such as a customer sending in a notice to change his address or a customer conducting a transaction at an automatic teller machine). In any of these circumstances, the event 315 causes a process to be implemented which may uses application software and/or data from the IT architecture section as described below.

The IT architecture 74 includes application software 330 which processes data 332 which includes business information 319 from the business architecture section 72. An enterprise technology framework 340 incorporates the application software 330 and the data 332 as well as the current IT environment 342 and reference architecture 346 and defines a delivery environment 348. The delivery environments 348 include the systems on which data 332 is stored and are implemented at locations 320 using products and standards 336. The enterprise technology framework 340 and the application software 330 are based on the principle 306 providing a framework for component and design decisions.

Various components of the framework are taught by John Zachman and his teaching is specifically incorporated by reference herein. His teachings are directed primarily to the components and are not integrated into a single framework of the type described in connection with the present invention, however, and his system is lacking in a guiding tool and a single database for ease of reference and use.

Application software 330 supports user groups 334 which exist at locations 320. Governance 350 manages change and evolution in the current IT environment 342 and other components of the system.

As an example of a situation where a change in a business framework may influence a change in a information technology framework (and vice versa), consider a company which offers catalog shopping through a printed catalog. If it decides to put the catalog on the Internet and become an e-tailer, that is a decision in a business framework (its processes) which influences its capabilities and its application software, among other things (in its IT architecture). That same business might have made a decision instead to have a presence on the web, changing its IT architecture with the additional applications and functions to support a web presence. From this change in its IT architecture, it capabilities and its business architecture may also change. Thus, it will be seen that changes in a business's business framework or architecture influence its business architecture or framework and vice versa because of the interrelationships of the elements and the cause and effect relationships between the objectives, the capabilities and the directions of the business, making it desirable (if not necessary) to integrate the consideration of the various aspects of the business together rather than separately.

Of course, many modifications of the present invention will be apparent to those skilled in the relevant art in view of the foregoing description of the preferred embodiment, taken together with the accompanying drawings. For example, the present invention is not limited to the particular lines of demarcation between various models and, in practice, the enterprise architecture may be delivered in a different tool than the database described and the method of using an altering it may differ from the navigator described herein. In some cases, one of more of the functions may be omitted or combined with other functions. For example, governance may be combines with the business structure in defining the roles and responsibilities for changes within the organization and its processes in some systems. Some of the features and elements of the present invention may be useful without the corresponding use of other features and elements. By illustration, the use of a generic or universal template which applies in various industries is useful, but not essential, to the present invention. Also, the use of locations may not be needed in a small organization which exists at a single location or at which the business and IT functions are managed, for example, in a utility which serves a small geography from a single central location. Additionally, many modifications can be made to the system implementation and the method of implementing security in an IT solution. To illustrate a representative modification, many businesses have deviations based on the requirements of the business and its processes. Accordingly, the foregoing description of the preferred embodiment should be considered as merely illustrative of the principles of the present invention and not in limitation thereof.

Having thus described the invention, what is claimed is:

1. A computerized method of integrating a business component as a digital representation of a business architecture of an integrated enterprise with an information technology component as a digital representation of the integrated enterprise's information technology architecture, the business component and the information technology component stored in at least one computer processing system, the method steps comprising:
   integrating and coupling at least one operation between an enterprise directions component stored in the computer processing system being a digital representation of the directions of the enterprise with the business component and the information technology component in the computer processing system;
   integrating and coupling at least one operation between an enterprise capabilities component stored in the computer processing system being a digital representation of the capabilities of the enterprise with the business component and the information technology component in the computer processing system;
   integrating and coupling at least one operation between an enterprise principles component stored in the computer processing system being a digital representation of the principles of the enterprise with the business component and the information technology component in the computer processing system;
   operationally coupling the enterprise directions component and the enterprise capabilities component;
   integrating the business component as a plurality of business section components comprising a business information section component and a business processes section component and a business data section component;
   operationally coupling the business processes section component and the enterprise capabilities component;
   integrating the information technology component as at least application software and an information technology data section component;
   operationally coupling the application software and the business processes section component and the enterprise principles component;
   operationally coupling the information technology data section component and the business information section component;
   assessing the impact upon and determining the changes of the business component resulting from changes to the information technology component prior to implementation of the changes in the information technology architecture;
   assessing the impact upon and determining the changes of the information technology component resulting from changes to the business component prior to implementation of the changes in the business architecture;
   outputting an impact assessment work product of the impact on and changes in each respective component.

2. The computerized method of claim 1 further comprising:
   providing a front-end navigator executing in at least one computer processing system to access the business data section component and the information technology data section component stored in a computer memory;
   operationally coupling the business data section component and the information technology data section component with one or more business section components and with one or more information technology components; and
   enabling an individual to access the impact assessment work product.

3. The computerized method of claim 1 further comprising:
   integrating a business structure section component in the business component;
   integrating a business units section component in the business component;
   integrating a business roles and responsibilities section component in the business component;
   integrating a business features and functions section component in the business component;
   integrating a business events section component in the business component;
   providing at least one operational coupling among the business structure section component, the business units section component, the business roles and responsibilities section component, the business features and functions section component, and the business events section component with the business processes section component;
   assessing the impact upon and determining the changes within the business component resulting from changes in one or more of the business structure section component, the business units section component, the business roles and responsibilities section component, the business features and functions section component, and the business event section component.

4. The computerized method of claim 1 further comprising:
   integrating one or more reference information technology section components;
   integrating a current information technology environment section component;
   integrating an enterprise technology framework section component in the information technology component;
   providing at least one operational coupling among the one or more reference information technology section components and the current information technology environment section component and the enterprise technology framework section component and the application software;
   assessing the impact of changes and determining the changes within the information technology component resulting from changes in the one or more reference information technology section components and the current information technology environment section component and the enterprise technology framework section component and the application software.

5. The computerized method of claim 1 further comprising: customizing the one or more of the reference information technology section components to apply to a particular instance.

6. The computerized method of claim 5 further comprising: customizing the one or more of the reference information technology section components to apply to a particular industry.

7. The computerized method of claim 5 further comprising: customizing the one or more of the reference information technology section components to apply to a particular enterprise.

8. An enterprise system for modeling and integrating the operation of a business enterprise and an information technology processing system, the enterprise system implemented in a data processing system and comprising:
   at least one computer processing unit;
   at least one memory operatively coupled to and accessible by at least one computer processing unit;
   a database stored in at least one memory and accessible by at least one computer processing unit;
   a first business component portion operationally integrated in the database of the data processing system, the first business component portion comprising a digital representation of the business operations and objectives of the business enterprise;
   a second information technology component portion operationally integrated in the database of the data processing system, the second information technology component portion comprising a digital representation of the information technology processing system and a digital representation of application software to process business information which the business enterprise uses to conduct its business;
   a governance function component operationally integrated in the database of the data processing system, the governance function component comprising a digital representation of the objectives of the business enterprise system;
   a navigator operatively coupled to the data processing system for using and modifying the first business and the second information technology component portions;
   a strategic direction, capabilities, and principles component operationally integrated with the database of the data processing system;
   an enterprise component operationally integrated in the database of the data processing system, the enterprise component having a digital representation of an enterprise structure of the business enterprise, an enterprise structure of the information technology processing system, roles and responsibilities of members of the business enterprise, inventory of skills, education and training of members of the business enterprise, policies and practices of the business enterprise, and enterprise structures;
   a business information technology alignment component operationally integrated in the database of the data processing system, the business information technology alignment component having a digital representation of strategies for business operations and the information technology processing system;
   an enterprise component operationally integrated in the database of the data processing system, the enterprise component having a digital representation of capabilities of the business operations and the information technology processing system;
   a plans component operationally integrated in the database of the data processing system, the plans component having a digital representation of business plans, information technology plans, projects, transitions, and enterprise and change plans;
   a users groups component operationally integrated in the database of the data processing system, the users group component comprising a digital representation of at least one user group and how the at least one user group affects the business enterprise;
   a products component operationally integrated in the database and operationally linked to an architectural building block component integrated in the database;
   a standards component operationally integrated in the database and operationally coupled to the architectural building block component;
   a principles component operationally integrated in the database, the principles component operationally coupled to an enterprise component integrated in the database, the architectural building blocks component integrated in the database, and a business information technology alignment component integrated in the database, the principles component comprising a digital representation of each of a plurality of principles applies and their respective use in operations of the business enterprise and information technology processing system;
   a business component operationally integrated in the database, the business component comprising a digital representation of business areas and units, unit plans, business locations, processes and activities and needs of operations of the business enterprise and information technology processing system;
   a reference component operationally integrated in the database, the reference component comprising reference components and models of reference business plans customizable for the business enterprise and information technology processing system; and
   a business locations component operationally integrated in the database, the business locations component comprising a list of business locations of the business enterprise and information technology processing system;
   a delivery environment component operationally integrated in the database to application software, data storage systems, data implementation systems within the business locations component, and to the products component and the standards component, respectively,
   a plurality of operational linkages among the components integrated in the database;
   a linkage assessment tool to evaluate the operational linkages between the components integrated in the database, the linkage assessment tool to assess the impact of changes to one of the components integrated in the database resulting from changes on at least one other component integrated in the database and output an impact assessment work product.

* * * * *